United States Patent [19]

Matsumoto et al.

[11] Patent Number: 4,860,662

[45] Date of Patent: Aug. 29, 1989

[54] LINEAR MOTOR TRUCK APPARATUS

[75] Inventors: Takashi Matsumoto, Ise; Shigeru Udagawa, Mie, both of Japan

[73] Assignee: Shinko Electric Co., Ltd., Japan

[21] Appl. No.: 241,758

[22] Filed: Sep. 7, 1988

Related U.S. Application Data

[63] Continuation of Ser. No. 844,828, Mar. 27, 1986, abandoned.

[30] Foreign Application Priority Data

Mar. 29, 1985 [JP] Japan ............................ 60-47809[U]
Jul. 31, 1985 [JP] Japan .......................... 60-117532[U]

[51] Int. Cl.[4] ............................................ B60L 13/02

[52] U.S. Cl. ...................................... 104/93; 104/107; 104/290

[58] Field of Search ....................... 104/89, 93, 95, 96, 104/106, 107, 109, 119, 292, 294, 290; 105/141, 144, 148, 150, 153; 191/60, 22 C

[56] References Cited

U.S. PATENT DOCUMENTS

| | | | |
|---|---|---|---|
| 3,631,809 | 1/1972 | Reece et al. | 104/294 |
| 3,888,185 | 6/1975 | Walsh | 104/290 X |
| 4,172,423 | 10/1979 | Monne | 104/89 X |
| 4,245,561 | 1/1981 | Krug | 104/130 X |
| 4,423,685 | 1/1984 | Kerckhoff | 104/93 X |

FOREIGN PATENT DOCUMENTS

| | | | |
|---|---|---|---|
| 361538 | 5/1962 | Switzerland | 104/96 |

*Primary Examiner*—Robert B. Reeves
*Assistant Examiner*—Frank H. Williams, Jr.
*Attorney, Agent, or Firm*—Kane, Dalsimer, Sullivan, Kurucz, Levy, Eisele and Richard

[57] ABSTRACT

A linear motor truck apparatus including: a truck having pairs of wheels rotatably mounted thereon; a supporting mechanism, having a rail extending along a line of travel of the truck, for supporting and guiding the truck along the line of travel by engaging the wheels with the rail; and a drive mechanism, including the linear motor, for driving the truck so that the truck may travel along the line of travel. The rail includes a pair of elongated sub-rail members each having a pair of inclined engaging faces parallel to the line of travel and converging to each other so that each sub-rail member has substantially V-shaped cross section and a jointing mechanism for jointing the sub-rail members so that the engaging faces of each sub-rail member converge to opposite directions; the wheels are mounted in at least four pairs; and the truck includes a mounting mechanism for mounting the at least four pairs of wheels thereto so that two pairs of the wheels are disposed to engage with one pair of the engaging faces and the other pairs are disposed to engage with the other pair of the engaging faces.

4 Claims, 6 Drawing Sheets

LINEAR MOTOR TRUCK APPARATUS

This is a continuation of co-pending application Ser. No. 844,828, filed on Mar. 27, 1986, now abandoned.

BACKGROUND OF THE INVENTION

The present invention relates to a truck apparatus using a linear motor such as a linear induction motor and a linear pulse motor.

Recently, various trucks using linear induction motors have been proposed for high speed three-dimensional travel. However, according to the prior art it is difficult to provide stable travel motion to the truck with a simple support and guide mechanism. The prior art truck apparatuses are further disadvantageous in that it is laborious to bend guide rails to correspond to a three-dimensional travel line of the truck, so that it is liable to produce local deformation or local deflection from the line of travel which causes unstable travel motion of the truck.

SUMMARY OF THE INVENTION

Accordingly, it is an object of the present invention to provide a linear motor truck apparatus which provides stable travel motion to the truck with a simple support and guide mechanism.

With this and other objects in view the present invention provides a linear motor truck apparatus including: a truck having pairs of wheels rotatably mounted thereon; a supporting mechanism, having a rail extending along a line of travel of the truck, for supporting and guiding the truck along the line of travel by engaging the wheels with the rail; and a drive mechanism, including the linear motor, for driving the truck so that the truck may travel along the line of travel. The rail includes a pair of elongated sub-rail members each having a pair of inclined engaging faces parallel to the line of travel and converging to each other so that each sub-rail member has substantially V-shaped cross section and a jointing mechanism for jointing the sub-rail members so that the engaging faces of each sub-rail member converge to opposite directions; the wheels are mounted in at least four pairs; and the truck includes a mounting mechanism for mounting the at least four pairs of wheels thereto so that two pairs of the wheels are disposed to engage with one pair of the engaging faces and the other pairs are disposed to engage with the other pair of the engaging faces.

Preferably, the joint mechanism includes a planar member, to opposite edges of which the sub-rail members are attached, and the sub-rail members and the planar member are curved along the line of travel of the truck. With such a construction, it is less laborious to bend the rail along a curved travel line of the truck than the prior art rail since the sub-rail members and the planar member have shapes easily bendable and may be separately bent, resulting in reduction in production cost of the rail. Further, it is less liable to produce local deflection from the travel line of the truck than the prior art rail.

In another preferred form of the present invention, the mounting mechanism may include a pair of wheel supporting members having opposite end portions, each wheel supporting member having a pair of the wheels rotatably supported on each end portion thereof, each wheel supporting member mounted to the truck to be rotatable about an axis perpendicular to a plane, on which the engaging faces of the sub-rail members converge, and perpendicularly passing substantially a point intermediate between the sub-rail members. By turning the wheel supporting members according to the curve of a curved rail, the truck is capable of smoothly passing the curved rail at a high speed.

BRIEF DESCRIPTION OF THE DRAWINGS

The invention will now be described by way of example with reference to the accompanying drawings in which.

DETAILED DESCRIPTION OF THE PREFERRED EMBODIMENTS

Figure 2:
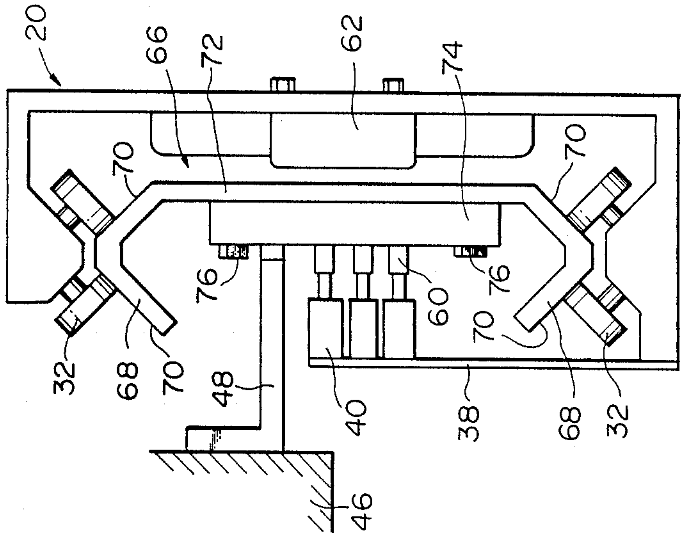
FIG. 2 is a front view of the truck apparatus in FIG. 1 with a straight rail.
Figure 1:
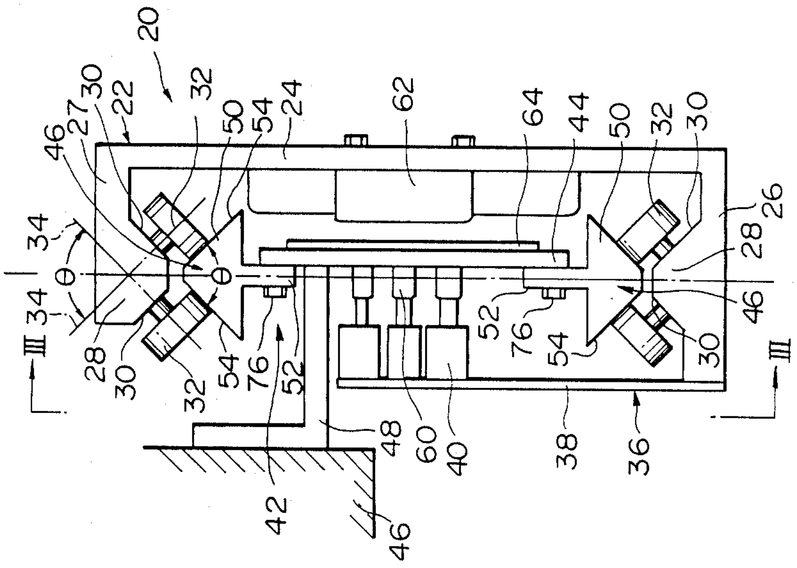
FIG. 1 is a front view of a truck apparatus according to the present invention with a curved rail.
Figure 3:
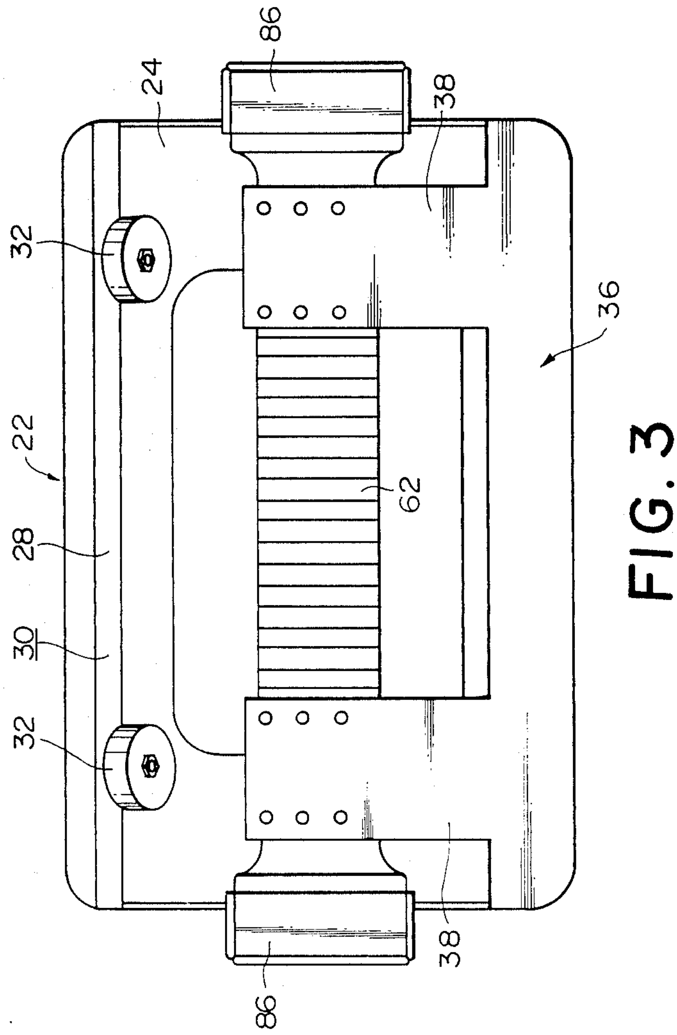
FIG. 3 is a view of truck taken along the line III—II in FIG. 1.
Figure 4:
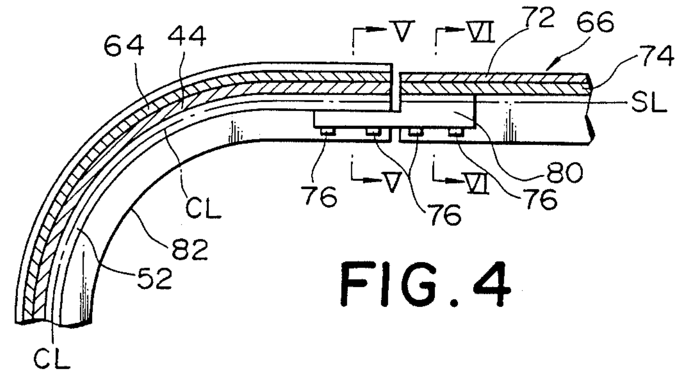
FIG. 4 is a plan view partly in section illustrating connection of the horizontally curved rail FIG. 1 and the straight rail in FIG. 2.
Figure 5:
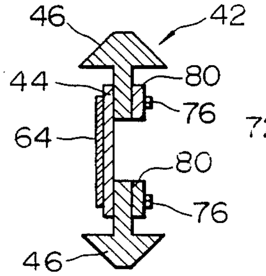
FIG. 5 is a cross section taken along the line V—V in FIG. 4.
Figure 6:
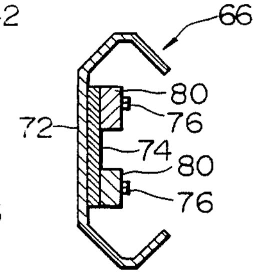
FIG. 6 is a cross section taken along the line VI—VI in FIG. 4.
Figure 7:
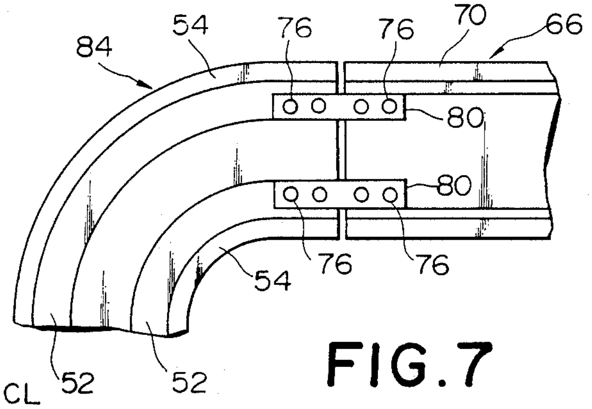
FIG. 7 is a side view illustrating the jointing of the vertically curved rail and the straight rail.

Referring to FIGS. 1 to 7, reference numeral 20 designates a self-propelled truck constructed according to the present invention, which includes a substantially channel-shaped truck body 22 having a web 24 and a pair of flanges 26 and 27 integrally formed with the web 24. One flange 26 is longer that the other 27. Each flange 26, 27 has a wheel supporting ridge 28 integrally formed with its inner face to project toward each other and to extend along it. Each supporting ridge 27, 28 has a pair of inclined surfaces 30 and 30 converging toward the other supporting ridge, thus providing a substantially V-shaped cross section to the supporting ridge. Four pairs of wheels 32 are rotatably supported on the inclined faces 30, 30, 30 and 30 of the supporting ridges 28 and 28 so that each pair of wheels 32 are respectively supported on a corresponding pair of inclined faces 30 and 30 so as to dispose rotation axes 34 and 34 thereof to cross at an acute angle $\theta$ as shown in FIG. 1 and to be perpendicular to corresponding inclined faces 30 and 30. Further, rotation axes 34 of corresponding two pairs of the wheels 32 are disposed on a plane perpendicular to the longitudinal direction of the truck body 22 or parallel to the sheet of the drawing of FIG. 1. The longer flange 26 is provided at its edge with a substantially U-shaped brush plate 36 having two parallel brush mounting hands 38 and 38, each having six brushes 40 mounted on it. FIG. 1 illustrates a curved rail 42 which includes a yoke member 44, which is a rectangular iron plate, and a pair of rod-shaped sub-rail members 46 and 46 mounted on opposite lateral edges of the yoke member 44. The yoke member 44 is attached to a base 47 through two angle-shaped bracket members 48 and 48 although only one is shown in FIG. 1. Each sub-rail member 46 includes a wheel engaging head 50 having a substantially V-shaped or a trapezoidal cross section and a neck portion 52 perpendicularly projecting from the rear face of the head 50 and extending along it. Each head 50 has a pair of inclined wheel engaging faces 54 and 54 containing an angle $\theta$ between them. With such a configuration, sub-rails 46 may be fabricated by extrusion molding from an aluminum alloy. The sub-rails rails 46 and 46 are curved to correspond to a curved line CL of travel of the truck 20 as illustrated in FIGS. 4 or 7 and are fastened with screws at their neck portions to the opposite lateral edges of the yoke member 44 which is also curved according to the curved line CL. Wheels 32 and 32 in each pair engage with respective inclined engaging faces 54 and 54 of head 50 of a corresponding sub-rail member 46. The supporting ridges 28 and the heads 50 of the sub-rails 46 are disposed so that the two inclined faces 30 and 30 of each supporting ridges 28 and the two wheel engaging faces 54 and 54 of each sub-rail 46 converge on a plane P parallel to the line of travel of the truck 20. The yoke member 44 has three parallel trolley rails 60 mounted on its one side to electrically contact respective brushes 40 so that electric power is supplied from a power source (not shown) via the brushes 40 to a primary unit 62 of the linear induction motor which unit is mounted on the web 24 of the truck 22. The yoke member 44 has a secondary unit 64 of the linear induction motor, which is a rectangular aluminum or copper plate, bonded on the other side of the yoke member to face the primary unit 62.

FIG. 2 illustrates a straight rail 66 for a straight travel line SL of the truck 20. The straight rail 66 is integrally formed of a single rectangular plate by bending its opposite lateral edge portions in the same V-shaped cross section as the heads 50 of the sub-rails 46 so that the insides of its bent edges 68 and 68 face to each other. Each bent edge portion of the straight rail 66 has a pair of inclined wheel engaging faces 70 and 70 forming an angle equal to $\theta$. The four pairs of wheels 32 also engage the wheel respective engaging faces 70 of the straight rail in the same manner as the wheel engaging faces 54 of the curved rail 42 as illustrated in FIG. 2. The flat portion 72 of the straight rail 66 serves as a secondary unit of the linear induction motor and has a rectangular yoke member 74 fastened with screws 76 to its one side facing the brushes 40. The yoke member 74 is supported to the base 46 through L-shaped bracket member 48 and has three parallel trolley rails 60 as in the yoke member 44 of the curved rail 42. The curved rail 42 may be jointed to the straight rail 66 by means of a pair of joint members 80 and 80 which are fastened with screws 76 to respective neck portions 52 of the sub-rails 46 and 46 of the curved rail 42 and to the yoke member 74 of the straight rail 66 as illustrated in FIGS. 5 and 6. FIG. 4 shows jointed portions of horizontally curved rail 82 and straight rail 66 and FIG. 7 shows jointed portions of vertically curved rail 84 and straight rail 66. In FIG. 3, reference numeral 86 indicates conventional shock absorbers mounted on the front and rear ends of the truck 20.

Figure 8:
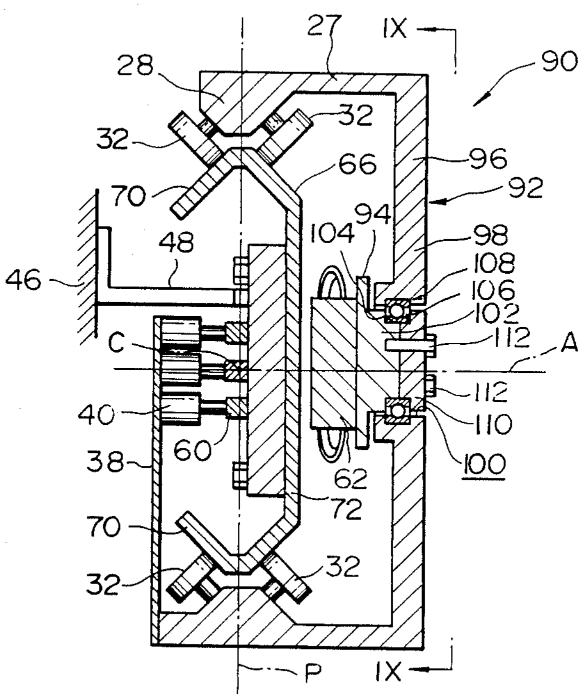
FIG. 8 is a view, taken along the line IX—IX in FIG. 9, illustrating a modified form of the truck apparatus in FIGS. 1 to 3.
Figure 9:
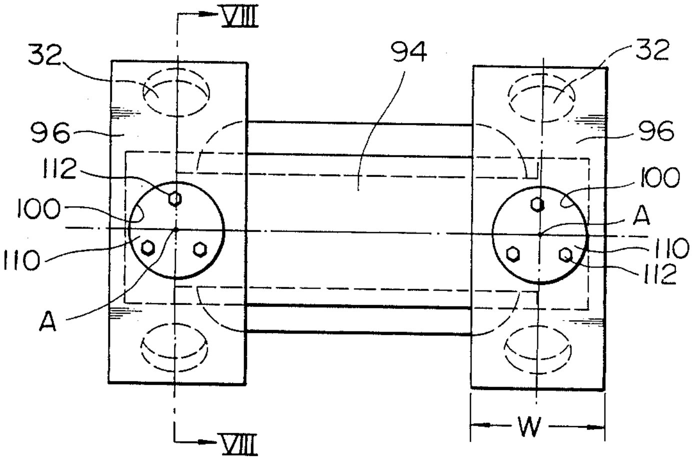
FIG. 9 is a view taken along the line VIII—VIII in FIG. 8.

FIGS. 8 and 9 illustrate a truck apparatus 90 of the same construction as that illustrated in FIGS. 1 to 3 except the structure of the truck 92, which includes a truck body 94, which is substantially a rectangular plate, and a pair of wheel frames 96 and 96 angularly movably attached to opposite ends of the truck body 94. The wheel frames 96 and 96 have the same profile as the truck body 22 in FIG. 1 but are much smaller in width W than the truck body 22 as clearly shown in FIG. 9. Each wheel frame 96 is provided at a center of its web 98 with a circular hole 100 formed through it. The truck body 94 has a pair of cylindrical projections 102 and 102 formed to perpendicularly project from opposite end portions of its one side. Each cylindrical projection 102 is placed into a corresponding circular hole 100 to fit its circular shoulder 104 to an inner race 106 of a ball bearing 108 and is fastened to a securing disc 110 with three screws 112, with the result that it is secured to the inner race 106 so that the wheel frame 96 is rotatable about an axis A (which perpendicularly passes through the plane P) at a point C intermediate wheels 32 of opposing pairs. The primary unit 62 of the linear induction motor is mounted on the other side of the truck body 94.

Figure 10:
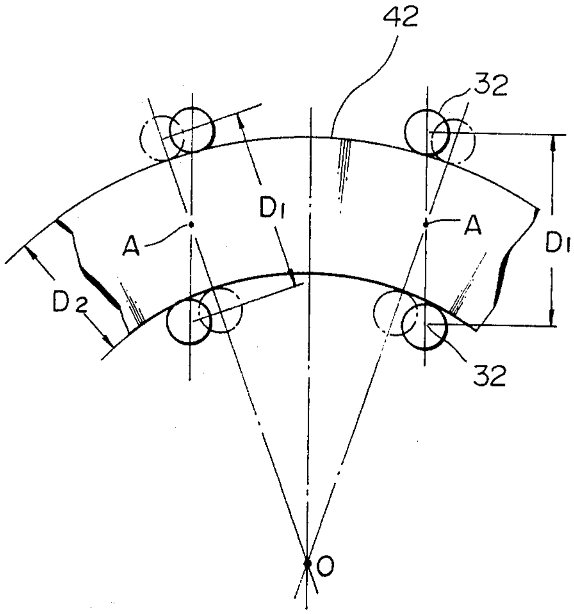
FIG. 10 is a diagrammatical illustration showing the relation between wheels of the truck and the curved rail.
Figure 11:
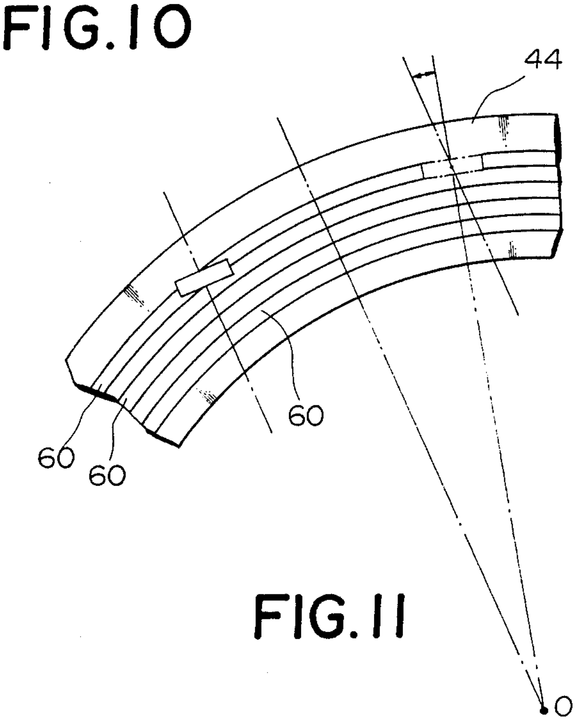
FIG. 11 is a partial view of the trolley rail of the truck apparatus in FIGS. 1–3 and 8.

With such a construction, when the truck 92 travels along the curved rail 42, the wheel frames 96 and 96 turn about the axes A so that wheels 32 are moved to positions shown by the phantom lines in FIG. 10 from the positions by the solid lines with the center lines thereof c1 being directed to a center O of curvature of the curved rail 42. Thus, the truck 92 is capable of smoothly passing the curved rail 42 at a high speed without changing the distance D1 between wheels 32 of opposing pairs or the distance D2 between the sub-rails 46 and 46. Also, the brushes 40 which are mounted to the wheel frames 96 and 96 also turn about the axis A from a position shown by the solid line to a position by the phantom line in FIG. 11 to extend along corresponding trolley rails 60, 60 and 60. Thus, uneven abrasion of the brushes 40 is prevented.

Figure 12:
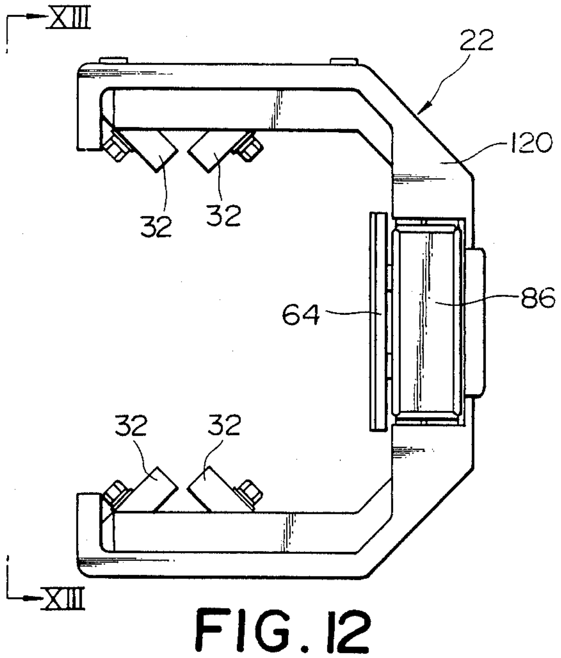
FIG. 12 is a front view of a modified form of the truck in FIG. 1.
Figure 13:
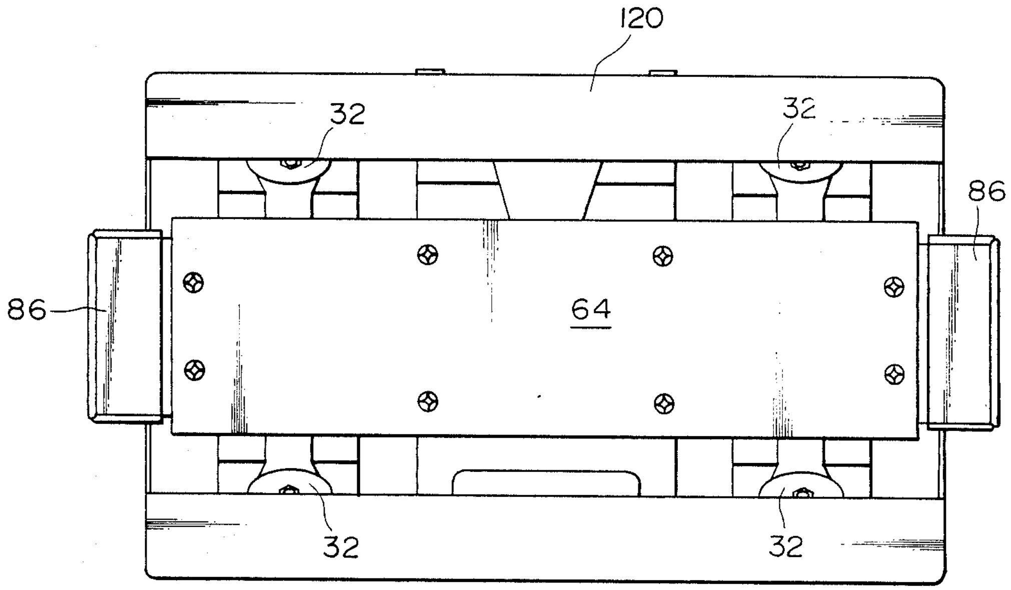
FIG. 13 is a view taken along the line XIII—XIII in FIG. 12.

The truck illustrated in FIGS. 12 and 13 is distinct from the truck in FIGS. 1–3 in that the secondary unit 64 of the linear induction motor is mounted on the truck while the primary unit 62 is mounted on the rail to face the secondary unit 64 although not shown. The reference numeral 120 designates a cover.

What is claimed is:

1. A linear motor truck apparatus of the type which includes a truck having pairs of wheels rotatably mounted thereon; supporting means having a plurality of rails extending along a line of travel of the truck, for supporting and guiding the truck along a line of travel by engaging the wheels with the rails, each rail comprises a pair of elongated sub-rail members, each sub-rail member having a pair of inclined engaging faces parallel to the line of travel and converging to each other so that each sub-rail member has substantially V-shaped cross section, and jointing means for jointing the sub-rail members so that the truck may travel along the line of travel, the inclined engaging face pairs facing away from each other, comprising:

a primary unit mounted to the truck to face the jointing means; and wherein:

the rails comprise a straight rail and a curved rail connected in series;

the straight rail comprises an elongated flat portion as the jointing means, having opposite lateral edges and opposite flat faces, a first elongated yoke plate member mounted at one face thereof on one flat face of the flat portion, and a first set of trolley rails mounted to the other face of the first yoke plate member, the straight rail being integrally formed at opposite lateral edges thereof with respective sub-rail members, the flat portion having the other flat face thereof facing the primary unit to serve as a secondary unit, the flat portion extending along the line of travel as a secondary unit;

the curved rail comprises a second elongated yoke iron plate member as the jointing means, having opposite lateral edges and opposite flat faces, an elongated secondary unit aluminum plate as the secondary unit, mounted at one face on one flat face of a second yoke plate member to extend along the line of travel to face the primary unit and a second set of the trolley rails mounted to the other flat face of the second yoke plate member for supplying electric power, the curved rail being curved along the line of the travel the sub-rail members of the curved rail being a solid aluminum alloy rod and being jointed to respective lateral edges thereof;

the wheels are mounted in at least four pairs; and the truck comprises a power receiving means mounted thereto to electrically contact the trolley rails for receiving electric power from the trolley rails and electrically connected to the primary unit for energizing the primary unit, and means for mounting the at least four pairs of wheels thereto so that two pairs of the wheels are disposed to engage with the pair of the engaging faces of one sub-rail of each rail and the other pairs are disposed to engage with the pair of the engaging faces of the other sub-rail.

2. A linear motor truck apparatus as recited in claim 1, wherein said mounting means comprises a pair of wheel supporting members having opposite end portions, each wheel supporting member having a pair of the wheels rotatably supported on each end portion thereof, each wheel supporting member mounted to the truck to be rotatable about an axis perpendicular to a plane, on which the engaging faces of the sub-rail members converge, and perpendicularly passing substantially a point intermediate between the sub-rail members.

3. A linear motor truck apparatus as recited in claim 1, wherein:

the truck comprises a substantially channel-shaped truck body including a web and a pair of flanges jointed to the web, the web having an inside face;

the primary unit is mounted on the inside face of the web;

the wheels mounting means comprises at least four wheel pair mounting means, each wheel pair mounting means mounting a pair of the wheels to an inside of a corresponding flange of the truck;

the power receiving means comprises a brush supporting member mounted to one flange of the truck, the brush supporting member having a free end, and brushes attached to the free end of the brush supporting member so that the brushes electrically contact respective trolley rails;

the flat portion of the straight rail is arranged to extend substantially in parallel with a plane on which the engaging faces of the sub-rail members converge; and the second yoke plate of the curved rail is arranged to extend substantially in parallel with the plane on which the engaging faces of the sub-rail members converge.

4. A linear motor truck apparatus as recited in claim 3, wherein the straight rail has a substantially channel shape having a pair of V-shaped cross-sectional flanges integrally formed with the flat portion thereof, each flange constituting the sub-rail member thereof.

* * * * *